United States Patent [19]

Ledwon et al.

[11] Patent Number: 4,630,595
[45] Date of Patent: Dec. 23, 1986

[54] ENERGY COLLECTOR FOR HEAT PUMP INSTALLATIONS

[76] Inventors: Erhard Ledwon, Tannenweg 29, D-6340 Dillenburg 3; Willibald Lang, Lorenz-Oechsler-Weg 13, D-7590 Achern 2, both of Fed. Rep. of Germany

[21] Appl. No.: 737,269

[22] Filed: May 23, 1985

[51] Int. Cl.[4] .................................................. F24J 2/00
[52] U.S. Cl. .................................... 126/417; 62/235.1; 165/177
[58] Field of Search ............... 62/235.1, 260; 126/439, 126/438, 417; 237/2 B; 165/172, 177, 184

[56] References Cited

U.S. PATENT DOCUMENTS

| | | | |
|---|---|---|---|
| 4,043,315 | 8/1977 | Cooper | 126/438 |
| 4,452,232 | 6/1984 | David | 126/439 |
| 4,535,754 | 8/1985 | Darr | 62/235.1 |

Primary Examiner—Henry Bennett
Attorney, Agent, or Firm—Burns, Doane, Swecker & Mathis

[57] ABSTRACT

A heat exchanger body comprises helical coils arranged to form a toroid in which the axis of the toroid is vertical and the coils lie substantially vertically. The coils comprise four 90° coil segments each having an inlet and an outlet. The body is supported from a vertical stand by means of radially extending tubes. The tubes also function to communicate the coils with upright conduits in the stand to conduct a heat exchange medium to and from the body.

8 Claims, 5 Drawing Figures

FIG. 1

ENERGY COLLECTOR FOR HEAT PUMP INSTALLATIONS

BACKGROUND AND OBJECTS OF THE INVENTION

The invention concerns an energy collector for heat pump installations intended for outside placement and comprising a stand and an air-heat exchanger body supported by it, with a heat transfer medium flowing through the body.

Heat pump installations extract thermal energy from the environment and bring it to a higher temperature level suitable for utilization, in particular for heating purposes. Thermal energy may be extracted from the air, the ground, ground water, a flow of waste water or other sources of heat. The process requires heat exchanges which collectively are designated energy collectors.

The present invention relates to an energy collector intended for outdoor placement and primarily serving to extract heat from the air of the environment. Additionally, however, such an energy collector also extracts thermal energy from rain water and solar radiation. The energy collector should therefore provide optimum heat transfer and, in particular, heat transfer without excessive thermal loss. The energy collector should further be of a simple configuration in order to keep manufacturing and maintenance costs low. Since the energy collector is placed in numerous cases in the immediate vicinity of dwellings, it should be aesthetically appealing and small in size, while providing a high heat transfer capacity.

Energy collectors of the afore-mentioned type are known as "energy trees". A stand carries heat exchanger bodies in the form of plates, arranged mostly in a horizontal manner. However, in relation to the external dimensions of the energy collector, the effective surface area that is important with regard to heat transfer efficiency is relatively small. Intensive contact with surrounding area presumes at least a slight horizontal movement of the air. Rain water and solar radiation reach only a very small proportion of the heat exchanger surface and therefore contribute practically nothing to the recovery of heat.

Other energy collectors are known, the heat exchanger whereof consists of bundles of helical tubes through which a heat transport medium is flowing. The tubular coils formed in this manner are located on a cylindrical surface with a vertical axis or on truncated conical surfaces. Rain water flows around this basket-like heat exchanger body which is fully exposed to sun light, but its effective surface is relatively small in relation to its external dimensions. If thin-walled tubes are used, the investment for a support structure is relatively high.

An object of the invention involves providing an energy collector of the afore-mentioned generic type, having a large heat exchange surface around all sides of which the ambient air flows. A further object is that the collector be fully exposed to solar radiation and be characterized by low construction and maintenance expenditures and small dimensions. Another object is that the collector have an appealing appearance, making possible its placement in the immediate vicinity of dwellings.

SUMMARY OF THE INVENTION

These objects are attained according to the invention in that the heat exchanger body comprises helical tubes through which the heat transport medium is flowing, the tubes being arranged along a toroidal path.

A heat exchanger body of this type may be constructed at a very low cost from coils of tubes. A great length of tubing may be installed within relatively small dimensions so that the heat exchange surface is large, while the volume of the heat transport medium may be kept low. The heat exchange surface formed in this manner is not only exposed to the ambient air, but is also available for the unimpeded recovery of heat from rain water and solar radiation.

It is especially advantageous to arrange the heat exchanger body (i.e., the toroid) horizontally and the individual tube coils essentially vertically. It is then possible to connect the stand, laid out as the inflow reservoir and reflux for the heat transport medium, in a very simple manner with the tube coils, wherein advantageously the radial tubes emanating from the stand form not only the tubular connections for the heat transport medium, but also the supporting joint between the body of the heat exchanger and the stand.

BRIEF DESCRIPTION OF THE DRAWING

The invention is explained in more detail below with the aid of an example of embodiment with reference to the drawing. In the drawing.

DETAILED DESCRIPTION OF A PREFERRED EMBODIMENT OF THE INVENTION

Figure 1:
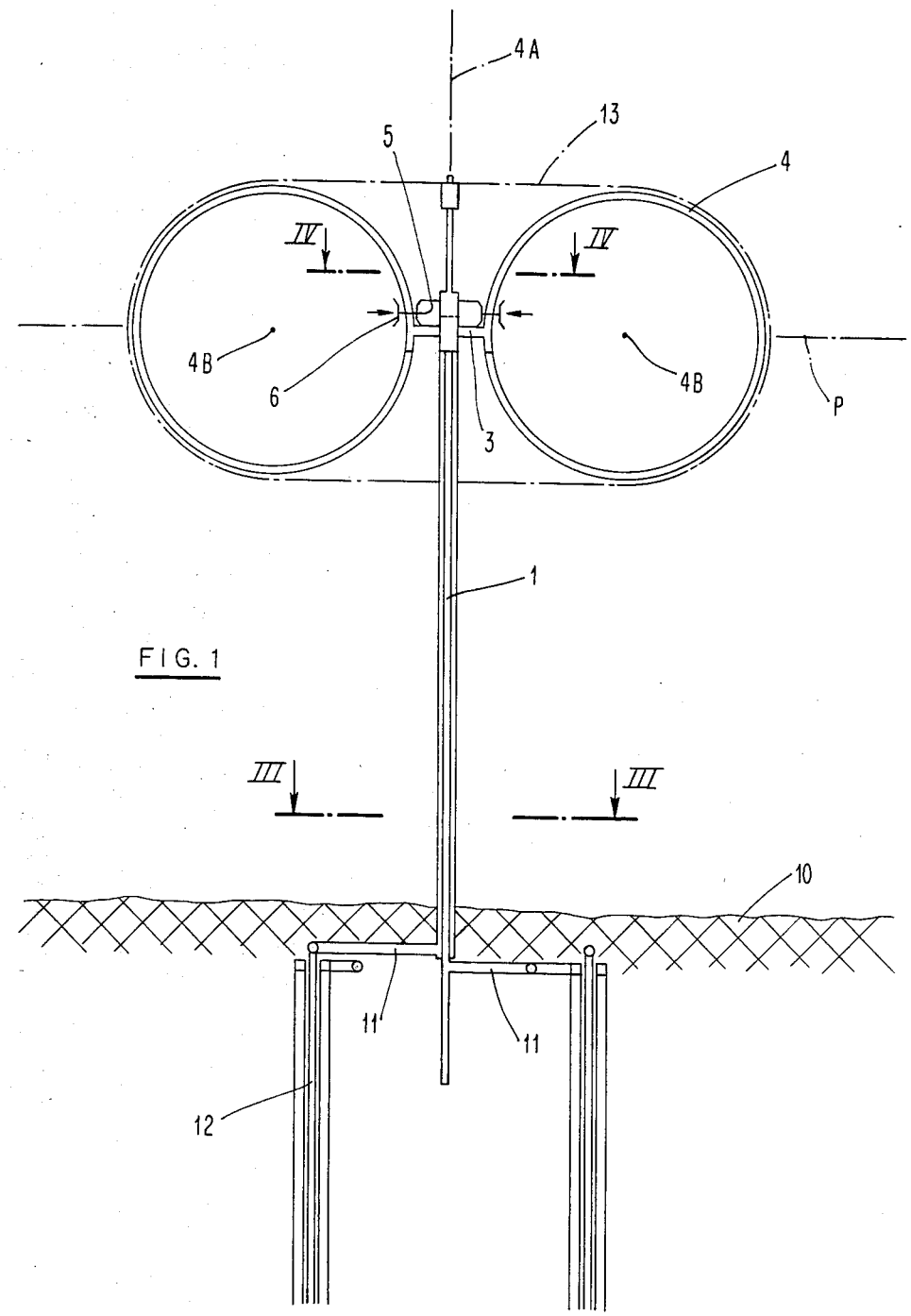
FIG. 1 depicts an energy collector in a vertical section, connected with latent underground storage tubes.
Figure 2:
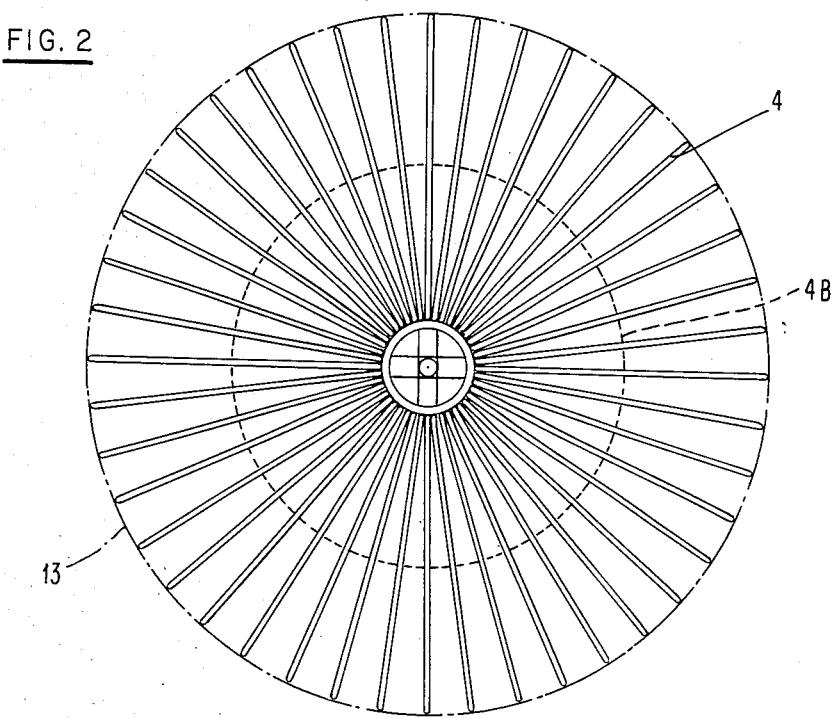
FIG. 2 depicts a simplified top view of the energy collector according to FIG. 1.
Figure 3:
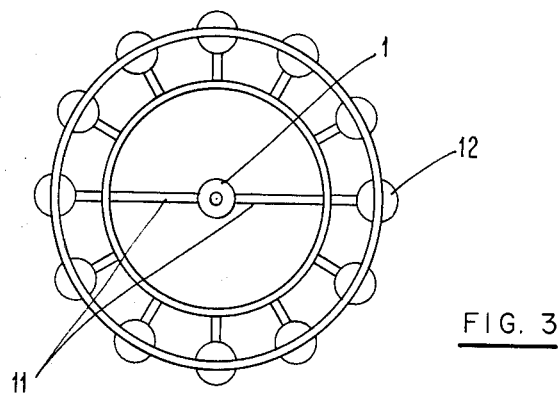
FIG. 3 depicts a section of line III—III in FIG. 1.
Figure 4:
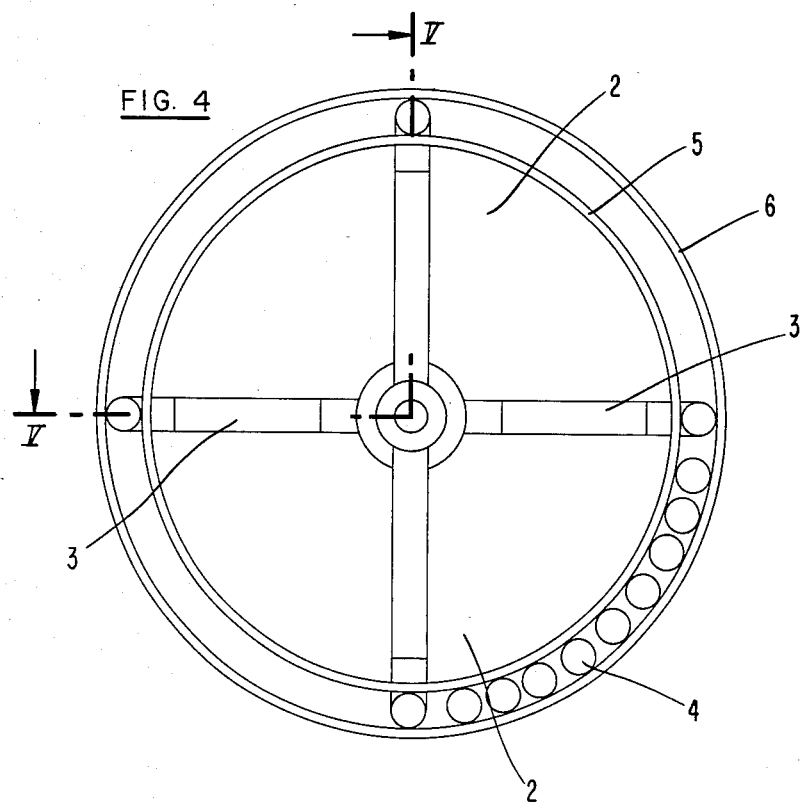
FIG. 4 depicts an enlarged section of line IV—IV in FIG. 1.
Figure 5:
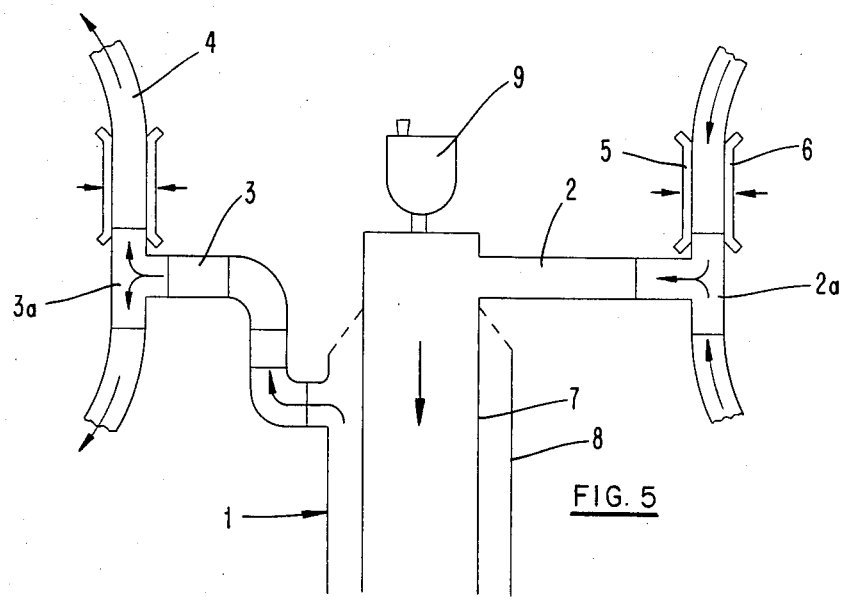
FIG. 5 depicts a section of line V—V in FIG. 4.

The energy collector shown in the drawing and intended for connection with a heat pump installation, comprises a stand 1 in the form of a double pipe 7,8, from which the radial tubes 2 and 3 emanate, respectively. Helical tube coils 4 are arranged to form a toroid surrrounding the upper end of the strand 1, i.e., a circular surface the vertical main or center axis 4A whereof coincides with the axis of the stand 1. The helical tubes define a helix axis 4B which is endless (e.g., circular) about the main axis 4A (FIG. 1). That endless axis 4A defines a plane P disposed perpendicularly to the main axis 4A. The tube coils 4 are clamped at their locations adjacent to the center axis between two clamping rings 5 and 6, as seen in FIGS. 4 and 5.

The coils are arranged to form four separate collector segments, each segment extending 90° along the toroidal path. The inlet of each segment is connected by means of a T-piece 3a with one of the radial tubes 3. The inlet of the adjacent collector segment located on a quarter circle arc is also connected with the T-piece 3a. The outlets of two adjacent collector segments are connected by means of a common T-piece 2a with the radial tubes 2. As shown in FIG. 5, the radial tubes 2 are connected with an inner pipe 7 of the stand 1, forming the reflux for the heat transport medium, for example, a sol. An outer pipe 8 surrounding the inner pipe 7 at a distance, is connected through the radial tubes 3 with the inlets of the collector segments and forms the inlet reservoir for the heat transport medium. A vent is connected with the upper end of the stand 1.

To the lower end of the stand 1, which is anchored in the ground 10, latent storage tubes 12 are connected by means of the lines 11, the storage tubes being arranged in the form of a wreath in the ground 10.

The radial tubes 2, 3 form a supporting joint between the heat exchanger body formed by the tube coils 4.

As indicated in FIG. 1 by dot-and-dash lines, the toroidal heat exchanger body formed by the tube coils 4 may be covered with transparent shrink foil 13. In this manner, highly efficient heating is obtained through solar radiation in view of the "greenhouse effect" generated.

The toroidal body is arranged horizontally, i.e., its longitudinal axis is vertical. The coils are thus oriented vertically.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Energy collector for an outdoor heat pump installation, comprising an upright stand and an air-heat exchanger body through which a heat transport medium is to be conducted, said body mounted on said stand and comprising helical tubular coil means for conducting the heat transport medium, said coil means extending helically about a helix axis, said helix axis being endless about a main axis such that said coil means forms a toroid and said endless helix axis defines a plane disposed perpendicularly to said main axis.

2. Energy collector according to claim 1, wherein said coil means comprises a plurality of said coils each having an inlet and an outlet for the heat transfer medium.

3. Energy collector according to claim 1, including a pair of circular clamp rings spaced radially apart with reference to the main axis and clamping said coil means therebetween.

4. Energy collector according to claim 1, wherein said stand is in the form of a double concentric pipe comprising an inner pipe forming a reflux and an outer pipe constituting an inlet reservoir, said inner and outer pipes connected to said coil means.

5. Energy collector according to claim 4, wherein said coil means comprises at least two coil segments each having an inlet and an outlet for the heat transfer medium, said inner and outer pipes being connected to the outlets and inlets, respectively, of said coil segments by tubes extending radially with reference to the main axis.

6. Energy collector according to claim 5, wherein said radially extending tubes define means for supporting said heat exchanger body from said stand.

7. Energy collector according to claim 1, wherein said toroidal heat exchanger body is covered with a transparent shrink foil.

8. An energy collector according to claim 1, wherein said axis is vertically disposed whereby said coil means is vertically oriented.

* * * * *